US009296246B2

(12) United States Patent
Cruz et al.

(10) Patent No.: US 9,296,246 B2
(45) Date of Patent: Mar. 29, 2016

(54) ANTI-COUNTERFEITING OPTO-THERMAL WATERMARK FOR ELECTRONICS

(71) Applicant: International Business Machines Corporation, Armonk, NY (US)

(72) Inventors: Ethan E. Cruz, LaGrangeville, NY (US); Michael W. Harper, Round Rock, TX (US); Ryan M. Kruse, Round Rock, TX (US); Arden L. Moore, Cedar Park, TX (US); Brian G. Veraa, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 14/102,664

(22) Filed: Dec. 11, 2013

(65) Prior Publication Data

US 2015/0061279 A1    Mar. 5, 2015

Related U.S. Application Data

(63) Continuation of application No. 14/015,410, filed on Aug. 30, 2013.

(51) Int. Cl.
*G06K 9/74* (2006.01)
*B42D 25/36* (2014.01)
*G06K 9/00* (2006.01)
*B42D 25/20* (2014.01)

(52) U.S. Cl.
CPC ............... *B42D 25/36* (2014.10); *B42D 25/20* (2014.10); *G06K 9/00046* (2013.01)

(58) Field of Classification Search
CPC . G01N 21/59; G01N 21/47; G01N 2201/021; G01N 2201/0612; G01N 2201/062; G01N 15/1434; G01N 2800/60; G01N 33/57419; G01N 33/6854; G01N 15/147; G01N 15/1484; G01N 2015/149; G01N 2015/1497
See application file for complete search history.

(56) References Cited

U.S. PATENT DOCUMENTS

| | | | |
|---|---|---|---|
| 2005/0110978 A1* | 5/2005 | Potyrailo et al. | 356/71 |
| 2010/0118380 A1* | 5/2010 | Xue | 359/289 |
| 2011/0256351 A1 | 10/2011 | Xu et al. | |
| 2011/0293858 A1 | 12/2011 | Xu et al. | |

FOREIGN PATENT DOCUMENTS

WO        0031571        6/2000

OTHER PUBLICATIONS

"Brilliant Counterfeit Protection", Fraunhofer-Gesellschaft http://www.sciencedaily.com/releases/2010/06/100614093627.hrlll http://www.sciencedaily.com/rel eases120 I 0/06/100614093627.htm Jun. 15, 2010 , 2 Pages.

* cited by examiner

*Primary Examiner* — Michael P Stafira
(74) *Attorney, Agent, or Firm* — DeLizio Law, PLLC (57) ABSTRACT

An anti-counterfeiting technique presents, to a test thermoreflective mark at a first temperature, a first electromagnetic wave. A first test reflective profile for the test thermoreflective mark associated with the first temperature is recorded. A second electromagnetic wave is presented to the test thermoreflective mark at a second temperature. A second test reflective profile for the test thermoreflective mark associated with the second temperature is recorded. The first test reflective profile is compared with a first control reflective profile that is associated with a genuine thermoreflective mark. The second test reflective profile is compared with a second control reflective profile that is associated with the genuine thermoreflective mark.

6 Claims, 5 Drawing Sheets

ANTI-COUNTERFEITING OPTO-THERMAL WATERMARK FOR ELECTRONICS

RELATED APPLICATIONS

This application claims the priority benefit of U.S. application Ser. No. 14/015,410 filed Aug. 30, 2013.

BACKGROUND

Embodiments of the inventive subject matter generally relate to the field of thermoreflectivity and more particularly, to thermoreflectivity and anti-counterfeiting measures.

A common problem among many consumer goods is counterfeiting, specifically in the computer industry and luxury goods market. Currently several anti-counterfeiting techniques exist, such as holograms, watermarks, color-changing inks, etc. Unfortunately, many of these anti-counterfeiting techniques are vulnerable to replication. Because many anti-counterfeiting techniques are vulnerable to replication, it can be difficult to distinguish authentic products from their counterfeit counterparts.

SUMMARY

An anti-counterfeiting technique presents, to a test thermoreflective mark at a first temperature, a first electromagnetic wave. A first test reflective profile for the test thermoreflective mark associated with the first temperature is recorded. A second electromagnetic wave is presented to the test thermoreflective mark at a second temperature. A second test reflective profile for the test thermoreflective mark associated with the second temperature is recorded. The first test reflective profile is compared with a first control reflective profile that is associated with a genuine thermoreflective mark. The second test reflective profile is compared with a second control reflective profile that is associated with the genuine thermoreflective mark.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to measuring reflective profiles of a thermoreflective mark at two temperatures, in some embodiments, greater or fewer than two temperatures can be used to create reflective profiles. In other instances, well-known instruction instances, protocols, structures and techniques have not been shown in detail in order not to obfuscate the description.

A thermoreflective mark has both a particular pattern and a temperature sensitive coating. Because of the temperature sensitive coating, the reflectivity of the thermoreflective mark changes with variations in temperature. A "fingerprint" can be created for the thermoreflective mark, using, for example, a light emitter and a light detector. The reflectivity of the thermoreflective mark can be measured at different temperatures. This fingerprint can then be stored in a database, and used for comparison purposes in identifying counterfeit goods. Example representations of the fingerprint that may be stored for use in validating goods include reflectance profiles and a reflectance coefficient.

Figure 1A:
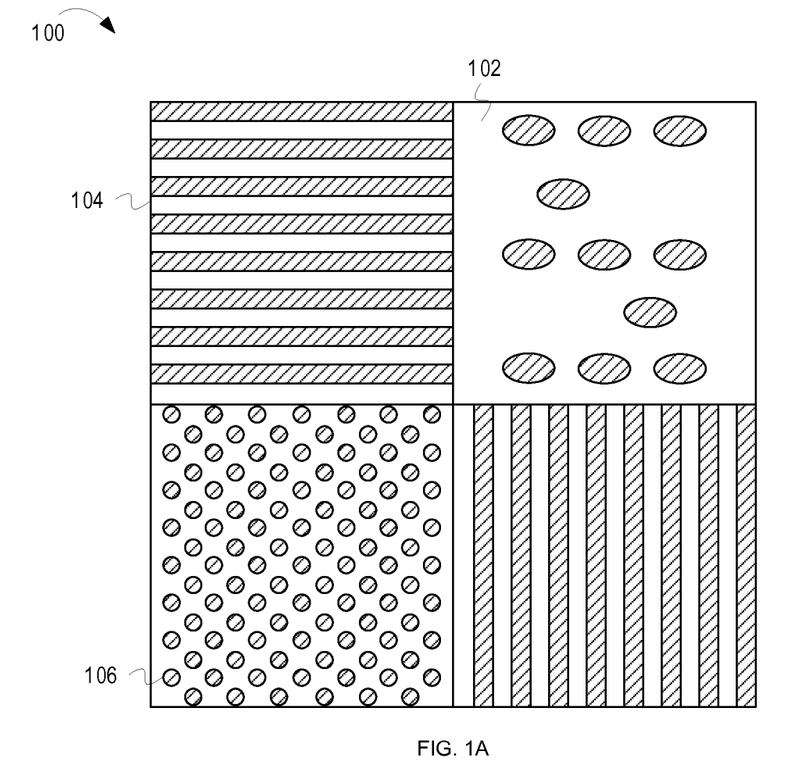
FIG. 1A is an overhead view of an example thermoreflective mark 100.

FIG. 1A is an overhead view of an example thermoreflective mark 100. The thermoreflective mark 100 comprises a coating that is temperature sensitive (a "thermoreflective coating"). The reflectivity of the thermoreflective mark 100 varies proportionally with temperature. For example, the thermoreflective mark 100 can reflect more or less light (or other electromagnetic wave to which it is subjected) dependent on the temperature of the thermoreflective mark 100. The thermoreflective mark 100 also comprises a specified pattern. The example specified pattern depicted in FIG. 1A includes four quadrants 102. Each quadrant 102 includes markings, such as etchings 104 and deposits 106. In some embodiments, the etchings 104 can be etched directly into the material on which the thermoreflective mark 100 is placed, and the deposits 106 can be metallic deposits positioned on the material on which the thermoreflective mark 100 is placed. The thermoreflective mark 100 is subjected to electromagnetic waves (e.g., light), and a reflectivity profile for the thermoreflective mark 100 is recorded.

The thermoreflective mark 100 provides two layers of anti-counterfeiting protection. First, the specified pattern causes an associated electromagnetic wave dispersion and reflection pattern. Second, the thermoreflective properties of the thermoreflective mark 100 cause the reflection pattern to vary proportionally to changes in temperature. To successfully counterfeit the thermoreflective mark 100, both the pattern and the proper thermoreflective properties of the thermoreflective mark 100 must be produced. The pattern can be varied for each item produced, by lot of items, weekly, monthly, etc., to provide an even greater level of anti-counterfeiting protection. Additionally, in some embodiments, the thermoreflective properties of the thermoreflective mark 100 can be varied (e.g., by changing the composition of the thermoreflective coating, thickness of the thermoreflective coating, etc.) for each item produced, by lot of items, weekly, monthly, etc.

Figure 1B:
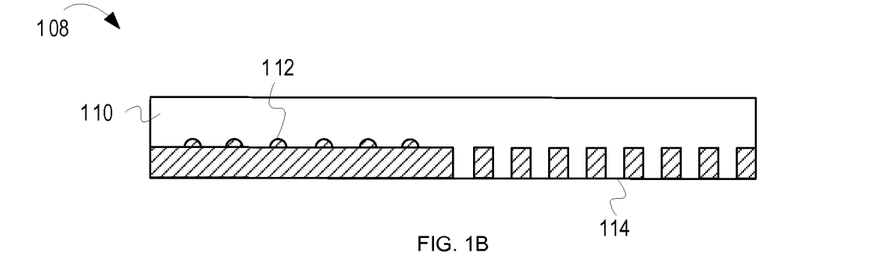
FIG. 1B is a cross-sectional view of an example thermoreflective mark 108.

FIG. 1B is a cross-sectional view of an example thermoreflective mark 108. As described in the discussion of FIG. 1A, the thermoreflective mark 108 comprises a thermoreflective coating 110 and a unique pattern comprising deposits 112 and etchings 114. In some embodiments, the thermoreflective mark 108 is an object separate from the item to which the thermoreflective mark 108 is affixed. For example, the thermoreflective mark 108 can be produced separately (e.g., a sticker) and affixed to an item, such as a computer motherboard. In other embodiments, the thermoreflective mark 108 can be part of the item. For example, a unique pattern can be created by etching the bare silicon side of a computer chip and placing metallic deposits on the bare silicon side of the computer chip. A thermoreflective coating 110 (e.g., a thin film) can be used to coat the area of the computer chip (or the entirety of the motherboard) to provide the thermoreflective mark 108 with its thermoreflective properties. In embodiments in which the thermoreflective mark 108 is part of the item itself, standard silicon processing tools can be used to create the thermoreflective mark 108. For example, during fabrication of the computer chip, standard microelectronics fabrication tools (e.g., a photolithography tool, a thin film deposition tool, an etching tool, etc.) can be programmed to read computerized files containing a specified pattern and create the specified pattern on the item. One or more of the microelectronics fabrication tools can etch the bare silicon side of the computer chip and place metallic deposits on the bare silicon side of the computer chip according to the specified pattern. Additionally, a lid, or some other packaging, can include the thermoreflective mark. Whether the thermoreflective mark is part of the item itself or the thermoreflective mark is part of a lid or some other packaging, creation of the specified pattern can be additive (e.g., depositing a thin film on top of the item/lid and specified pattern), subtractive (e.g., etching features directly into the item/lid), or both.

Figure 2:
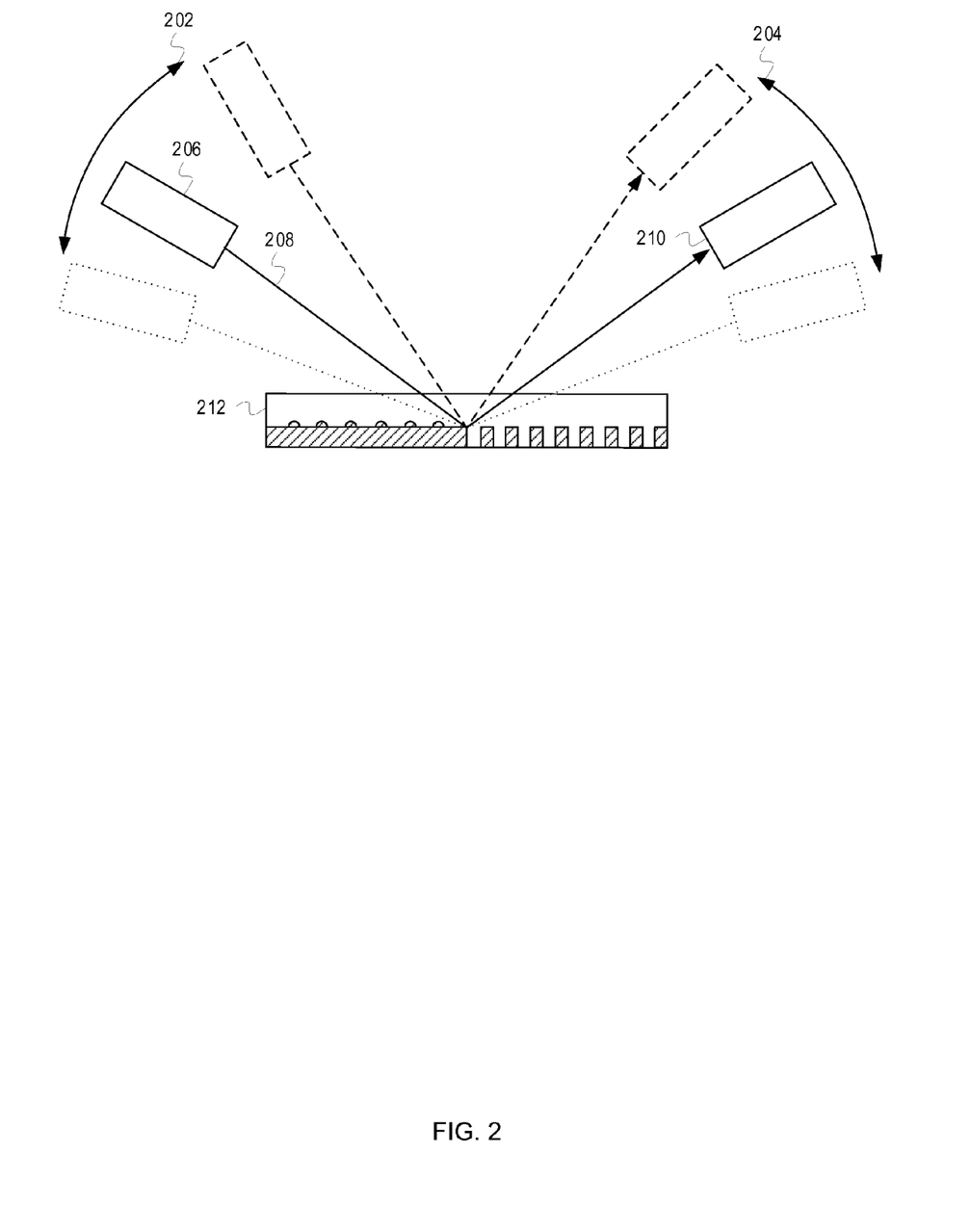
FIG. 2 depicts an example system for generating and recording reflective profiles for a thermoreflective mark 212.

FIG. 2 depicts an example system for generating and recording reflective profiles for a thermoreflective mark 212. Reflective profiles can be recorded for the thermoreflective mark 212 to create an identifying fingerprint for the thermoreflective mark 212. As depicted in FIG. 2, the example system comprises an electromagnetic wave source 206 and an electromagnetic wave detector 210. In some embodiments, the electromagnetic wave source 206 can be a light emitter, emitting light comprising a number of wavelengths (e.g., white light) or a light emitter emitting light at a single or small grouping of wavelengths (e.g., a laser). The electromagnetic wave 208 is emitted by the electromagnetic wave source 206 to the thermoreflective mark 212 and reflected to, and detected by, the electromagnetic wave detector 210. The reflected electromagnetic wave 208 is used to create a reflective profile for the thermoreflective mark 212. In some embodiments, additional data points can be created and added to the reflective profile by altering the position of the electromagnetic wave source 206 (as shown by arrow 202) and the electromagnetic wave detector 210 (as shown by arrow 204). Recording the reflectivity of the mark at varied incidence angles can create a richer reflective profile.

Figure 3:
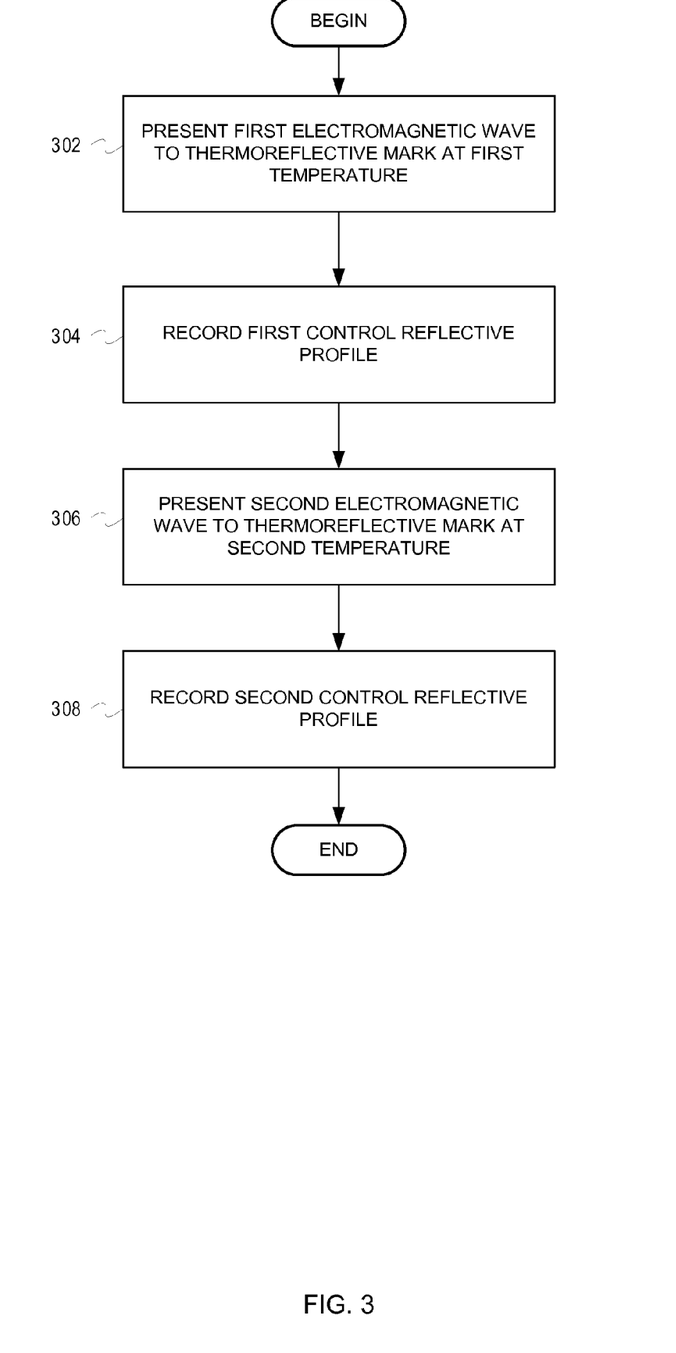
FIG. 3 is a flow diagram illustrating example operations for generating and recording reflective profiles for a thermoreflective mark.

FIG. 3 is a flow diagram illustrating example operations for generating and recording reflective profiles for a thermoreflective mark. Reflective profiles can be recorded at varying temperatures to create an identifying fingerprint for the thermoreflective mark. These operations can be performed on each item containing a thermoreflective mark to create a database used in identifying authentic thermoreflective marks, and by extension, authentic goods. In other words, the operations depicted in FIG. 3 can be used to create a database of control reflective profiles (and identifying fingerprints) for thermoreflective marks. The flow begins at block 302.

At block 302, an electromagnetic wave source presents a first electromagnetic wave to a thermoreflective mark at a first temperature. The electromagnetic wave source can emit an electromagnetic wave of any type that is suitable to producing a reflective profile, and can change position relative to the thermoreflective mark. Additionally, wavelength(s) of the emitted electromagnetic wave, incidence angle(s) of the electromagnetic wave, the first temperature, etc. can be controlled as to allow for easy verification of the authenticity of thermoreflective marks that are not known to be genuine. The flow continues at block 304.

At block 304, an electromagnetic wave detector records a first control reflective profile. The first control reflective profile includes all reflectivity readings at the first temperature, which can range from a single wavelength at a single incidence angle to multiple wavelengths at multiple incidence angles, and the various permutations thereof. Although the operations at blocks 302 and 304 are presented as occurring discretely in time, due to the high rate of speed at which electromagnetic waves travel, in practice, the operations at blocks 302 and 304 will likely overlap in time (i.e., in practice, a large enough number of photons (or other particles that comprise the electromagnetic wave) will be emitted, and the speed of light (or other electromagnetic wave) is such that the wave source will still be emitting photons as the first photons the wave source emitted reach the wave detector. The flow continues at block 306.

At block 306, the electromagnetic wave source presents a second electromagnetic wave to the thermoreflective mark at a second temperature. The wavelength(s) of the electromagnetic wave can be the same as the wavelength(s) of the electromagnetic wave emitted at the first temperature, or can be different than the wavelength(s) of the electromagnetic wave emitted at the first temperature. As with the operation at block 302, the electromagnetic wave source can move relative to the thermoreflective mark so as to create a rich reflective profile for the thermoreflective mark. Additionally, the wavelength(s) of the emitted electromagnetic wave, an incidence angle of the electromagnetic wave, the second temperature, etc. can be controlled so as to create easily reproducible results. The flow continues at block 308.

At block 308, an electromagnetic wave detector records a second control reflective profile. The second control reflective profile includes all reflectivity readings at the second temperature.

Figure 4:
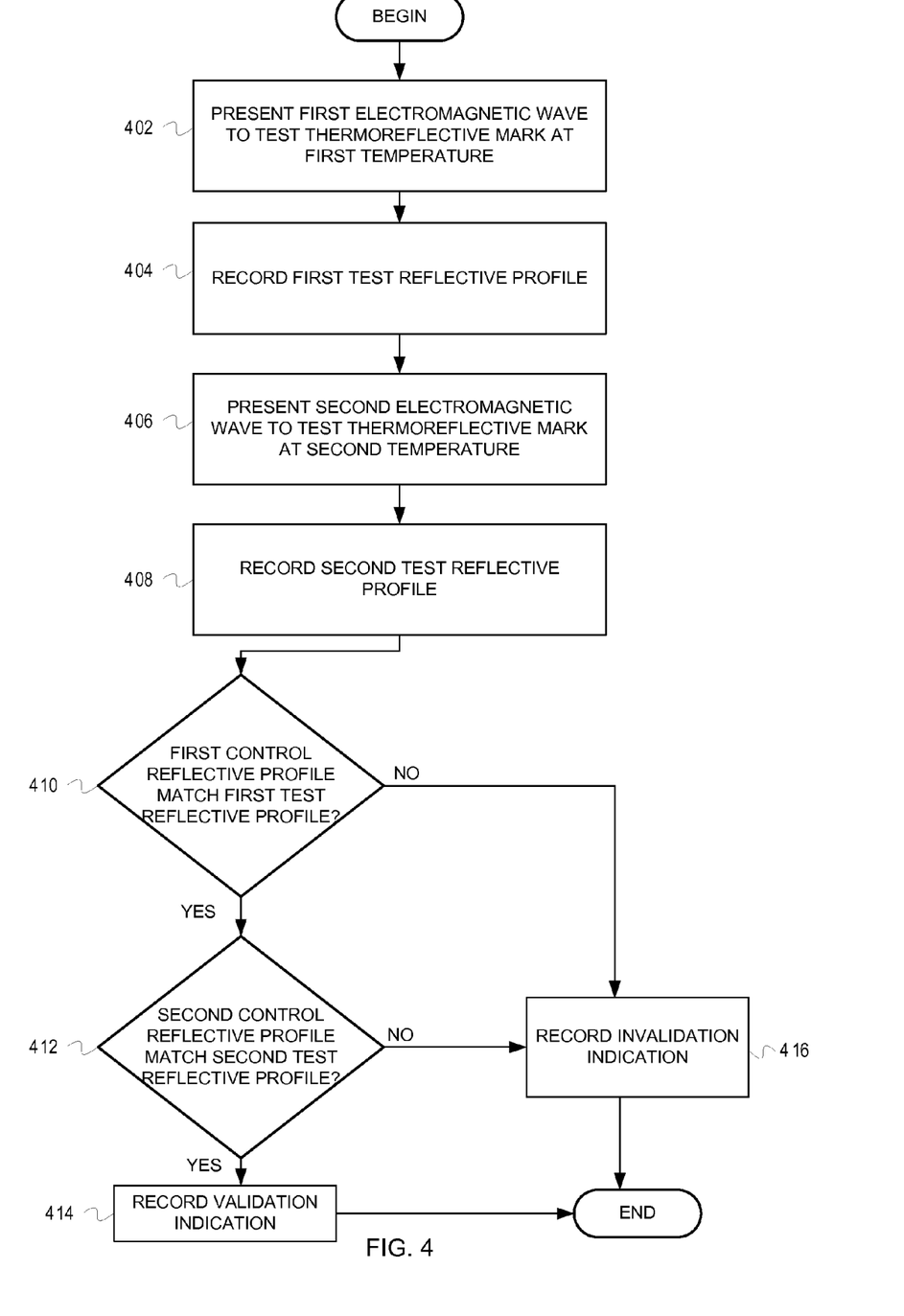
FIG. 4 is a flow diagram illustrating example operations for generating and recording reflective profiles for a test thermoreflective mark and comparing the reflective profiles for the test thermoreflective mark to control reflective profiles.

FIG. 4 is a flow diagram illustrating example operations for generating and recording reflective profiles for a test thermoreflective mark (the test thermoreflective mark being a the authenticity of which is unknown) and comparing the reflective profiles of the test thermoreflective mark to control reflective profiles. In order to confirm the authenticity of a thermoreflective mark, and by extension the good associated with the thermoreflective mark, a comparison between a reflective profile (i.e., an identifying fingerprint) of the thermoreflective mark in question the test thermoreflective mark and a thermoreflective profile (i.e., an identifying fingerprint) of a known genuine thermoreflective mark can be made. In some embodiments, each item contains a unique thermoreflective mark. In such embodiments, a reflective profile is created for each item and stored in a database (e.g., by serial number). To test the authenticity of an item bearing a legitimate serial number, a reflective profile can be created for the item and compared to the reflective profile on file for the corresponding serial number. As another example, when thermoreflective marks are varied by lot number, a reflective profile can be created for each lot and stored in a database by lot number. To test the authenticity of an item bearing a lot number, a reflective profile can be created for the item and compared to the reflective profile on file for the corresponding lot number. The flow begins at block 402.

At block 402, an electromagnetic wave source presents a first electromagnetic wave to a test mark at a first temperature. In some embodiments, the electromagnetic wave source emits an electromagnetic wave having the same wavelength(s) as the electromagnetic wave used for a first control reflective profile. Additionally, in some embodiments, the first temperature is the same temperature as the temperature used in creating the first control reflective profile. The flow continues at block 404.

At block 404, an electromagnetic wave detector records the first test reflective profile. The first test reflective profile includes all reflectivity readings at the first temperature. The flow continues at block 406.

At block 406, the electromagnetic wave source presents a second electromagnetic wave to the test mark at a second temperature. In some embodiments, the electromagnetic wave source emits an electromagnetic wave having the same wavelength(s) as the electromagnetic wave used for a second control reflective profile. Additionally, in some embodiments, the second temperature is the same temperature as used in creating the second control reflective profile. The flow continues at block 408.

At block 408, an electromagnetic wave detector records the second test reflective profile. The second test reflective profile includes all reflectivity readings at the second temperature. The flow continues at decision diamond 410.

At decision diamond 410, the first control reflective profile is compared with the first test reflective profile. The first control reflective profile is created using an authentic thermoreflective mark from an item with a correct serial number, lot number, build date, etc. In some embodiments, the first (and second) control reflective profiles are created at the time of manufacture of the item. In such embodiments, the first (and second) control reflective profiles can be stored in a database. In other embodiments, a known authentic thermoreflective mark can be used to create the first (and second) control reflective profile. The reflective profiles can be compared using any suitable means for the implementation of the reflective profile. Examples of reflective profiles include an image of a graph that plots reflectance versus incidence angle, numerical values for a thermoreflectance coefficient, a chart of data values (including, for example, reflectance, incidence angle, position on the thermoreflective mark from which the electromagnetic wave was reflected, temperature, and wavelength of the electromagnetic wave), images captured of the electromagnetic wave reflected off of the thermoreflective mark, etc. For example, in embodiments in which the reflective profiles are images (or any reflective profile type suitable to visual comparison), an image recognition program compares the reflective profiles on a pixel-by-pixel basis. In some embodiments, a tolerance is set (to account for errors, image quality variations, differing environmental conditions, etc.) to automate a validation process, and reflective marks that fall outside of the tolerance can be flagged for further comparison. In embodiments in which the reflective profiles are numerical values (e.g., thermoreflectance coefficients, reflectance values, temperatures, etc.), an application performs a numerical comparison on the reflective profiles. In embodiments in which the reflective profiles are text (e.g., data stored as a string), an application performs a string comparison on the reflective profiles. Additionally, values included in charts, arrays, vectors, etc. can be stored as strings (e.g., a chart can be stored as a series of characters and delimiters, an array can be stored as an array data type including a series of characters representing values, and a vector can be stored as a two values (one for a direction and a second for a magnitude)). In such embodiments, an application likewise performs a string comparison on the reflective profiles. If the first control reflective profile does not match the first test reflective profile, the flow continues at block 416. If the first control reflective profile does match the first test reflective profile, the flow continues at decision diamond 412.

At decision diamond 412, the second control reflective profile is compared with the second test reflective profile. If the second control reflective profile does not match the second test reflective profile, the flow continues at block 416. If the second control reflective profile does match the second test reflective profile, the flow continues at block 414.

At block 414, because both the first control reflective profile and the first test reflective profile match and the second control reflective profile and the second test reflective profile match, a validation indication is recorded. From block 414, the flow ends.

At block 416, it has previously been determined that either the first control reflective profile and the first test reflective profile, or the second control reflective profile and the second test reflective profile, do not match. Because of the inconsistency between the control reflective profiles and the test reflective profiles, an invalidation indication is recorded. From block 416, the flow ends.

Although examples refer to using a first temperature and a second temperature to create a control reflective profile for a thermoreflective mark and using the same first temperature and second temperature to validate a test thermoreflective mark, in some embodiments, a variation in temperatures is held constant instead. In such embodiments, the test thermoreflective mark is validated using a calculated thermoreflectance coefficient. For example, the equation $C=(1/R)(\Delta R/\Delta T)$ can be used to calculate the thermoreflectance coefficient, where C is the thermoreflectance coefficient, R is the reflectance, and T is the temperature. As can be seen, the thermoreflectance coefficient is directly proportional to the relative magnitude change in reflectance (i.e., the difference between the reflectance at the first temperature and the reflectance at the second temperature, divided by the reflectance at the first temperature), and inversely proportional to the change in the temperature (i.e., the difference between the first temperature and the second temperature). Consequently, so long as the reflectance of the thermoreflective mark (i.e., R) is recorded at the temperature at which the first control reflective profile was created, and the difference between the first temperature and the second temperature used to make the first control reflective profile and the second control reflective profile is known, a test thermoreflective mark can be validated by calculating the thermoreflectance coefficient for the test thermoreflective mark. Additionally, in some embodiments, the wavelength of the electromagnetic wave can be varied from a control reflective profile to a test reflective profile. Again, in such embodiments, the derived thermoreflectance constant is used to validate the test thermoreflective mark. Furthermore, in embodiments in which a test thermoreflective coefficient is calculated, not all operations depicted in FIG. 4 are necessary. For example, the operations depicted at blocks 410 and 412 are not necessary. Rather, the calculated thermoreflectance coefficient of the test thermoreflective mark is compared to the thermoreflectance coefficient of the thermoreflective mark that is genuine. However, an additional operation can be performed to compare the specified pattern of the thermoreflective mark that is genuine and a pattern of the test thermoreflective mark.

Although examples refer to using a first temperature and a second temperature, in some embodiments, more than two temperatures can be used to create reflective profiles. For example, reflective profiles can be created for a control thermoreflective mark at a first temperature, a second temperature, a third temperature, etc. Such embodiments can provide greater anti-counterfeiting protection.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
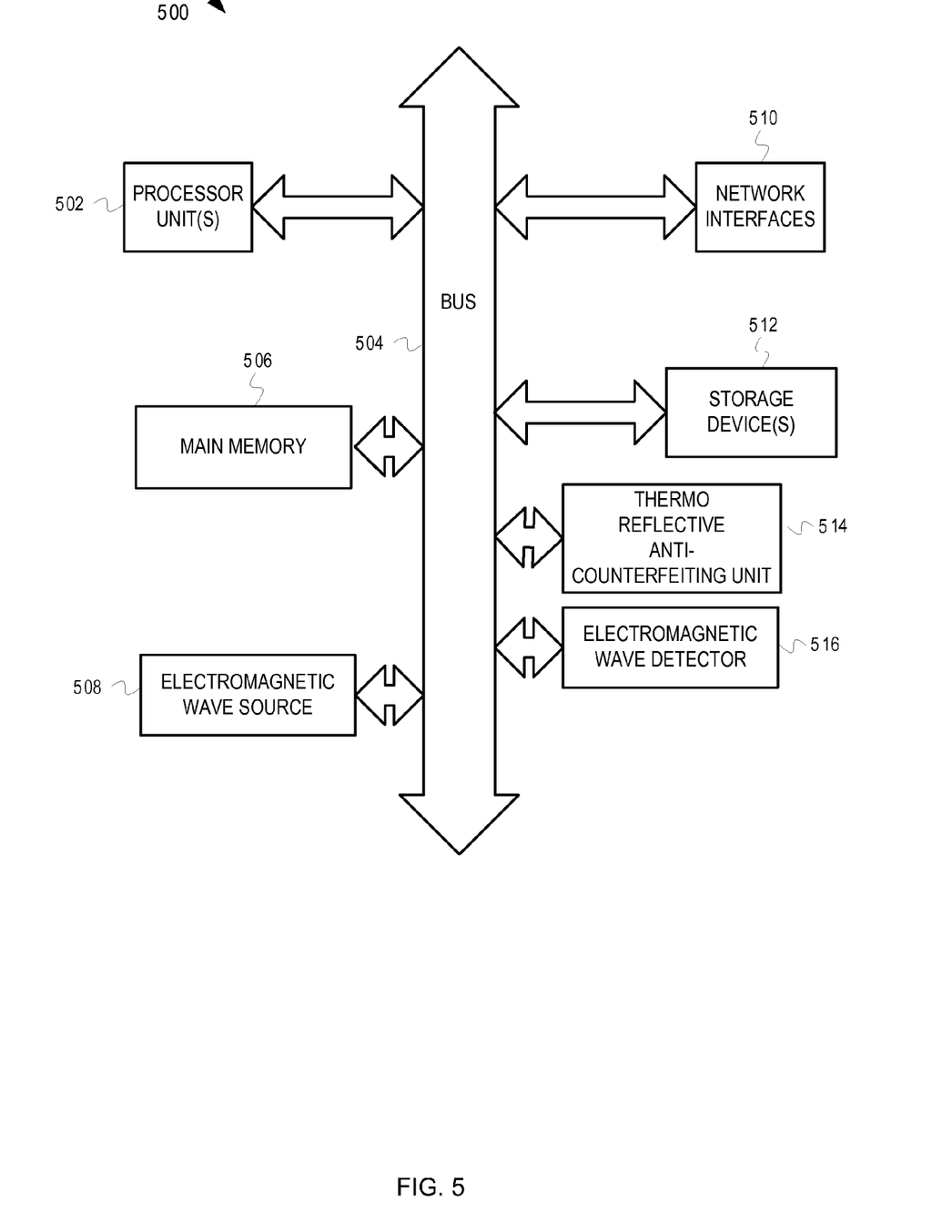
FIG. 5 depicts an example computer system that includes a thermoreflective anti-counterfeiting unit 514.

FIG. 5 depicts an example computer system that includes a thermoreflective anti-counterfeiting unit 514. A computer system includes a processor unit 502 (possibly including multiple processors, multiple cores, multiple nodes, and/or implementing multi-threading, etc.). The computer system includes memory 506. The memory 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 504 (e.g., PCI, ISA, PCI-Express, HyperTransport®, InfiniBand®, NuBus, etc.), a network interface 510 (e.g., an ATM interface, an Ethernet interface, a Frame Relay interface, SONET interface, wireless interface, etc.), and a storage device(s) 512 (e.g., optical storage, magnetic storage, etc.). The system 500 includes a thermoreflective anti-counterfeiting unit 514. The thermoreflective anti-counterfeiting unit 514 is operable to compare reflective profiles, calculate thermoreflectance constants, and compare thermoreflectance constants, as described herein. Any one of these functionalities may be partially (or entirely) implemented in hardware and/or on the processing unit 502. For example, the functionality may be implemented with an application specific integrated circuit, in logic implemented in the processing unit 502, in a co-processor on a peripheral device or card, etc. In addition, these functionalities can be implemented with program instructions encoded in the main memory 506, the storage device(s) 512, or other machine-readable media of the system 500. Further, realizations may include fewer or additional components not illustrated in FIG. 5 (e.g., video cards, audio cards, additional network interfaces, peripheral devices, etc.). The processor unit 502, the storage device(s) 512, and the network interface 510 are coupled to the bus 504. Although illustrated as being coupled to the bus 504, the memory 506 may be coupled to the processor unit 502. Additionally, the computer system 500 can include an electromagnetic wave source 508 and an electromagnetic wave detector 516. The electromagnetic wave source 508 is operable to present an electromagnetic wave to a thermoreflective mark. The electromagnetic wave detector 516 is operable to detect the electromagnetic wave, as reflected by the thermoreflective mark.

While the embodiments are described with reference to various implementations and exploitations, it will be understood that these embodiments are illustrative and that the scope of the inventive subject matter is not limited to them. In general, techniques for thermoreflective anti-counterfeiting as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for authenticating an item having a thermoreflective mark, the method comprising:
    presenting, to the thermoreflective mark at a first temperature, a first electromagnetic wave, wherein the thermoreflective mark has a pattern and a temperature sensitive coating;
    recording a first reflective profile produced from said presenting the first electromagnetic wave to the thermoreflective mark at the first temperature;
    presenting, to the thermoreflective mark at a second temperature, a second electromagnetic wave;
    recording a second reflective profile produced from said presenting the second electromagnetic wave to the thermoreflective mark at the second temperature; and
    validating the thermoreflective mark based, at least in part, on the first reflective profile and the second reflective profile, wherein said validating the thermoreflective mark is against control data that are based on a control thermoreflective mark, wherein the control data comprise a first control reflective profile produced from the control thermoreflective mark and a second control reflective profile produced from the control thermoreflective mark, and wherein validating the thermoreflective mark comprises:
        determining that the first reflective profile and the first control reflective profile match; and
        determining that the second reflective profile and the second control reflective profile match.

2. The method of claim 1, wherein the control data further comprise one or more of a reflectance of the control thermoreflective mark, a thermoreflectance coefficient for the control thermoreflective mark, and a temperature, and further comprising:
    calculating based, at least in part, on the first reflective profile and the second reflective profile, a thermoreflectance coefficient for the thermoreflective mark; and
    comparing the thermoreflectance coefficient for the thermoreflective mark and the thermoreflectance coefficient of the control thermoreflective mark.

3. The method of claim 1, wherein the temperature sensitive coating comprises a metallic thin film.

4. The method of claim 1, wherein the pattern comprises one or more of etchings, engravings, metallic dots, and metallic buildup.

5. The method of claim 1, wherein the first reflective profile and the second reflective profile include one or more of images, charts, graphs, thermoreflectance coefficients, temperatures, incidence angles, wavelengths, arrays, vectors, and positions on the thermoreflective mark from which the first and second electromagnetic wave was reflected.

6. The method of claim 1, further comprising:
    aggregating the first control reflective profile and the second control reflective profile; and
    creating, based at least in part on the aggregating, a control identifying fingerprint for the control thermoreflective mark.

* * * * *